Dec. 2, 1969                I. D. JOHNSON                3,482,235
                        FIELD GRADIENT DETECTOR
                         Filed Dec. 1, 1965
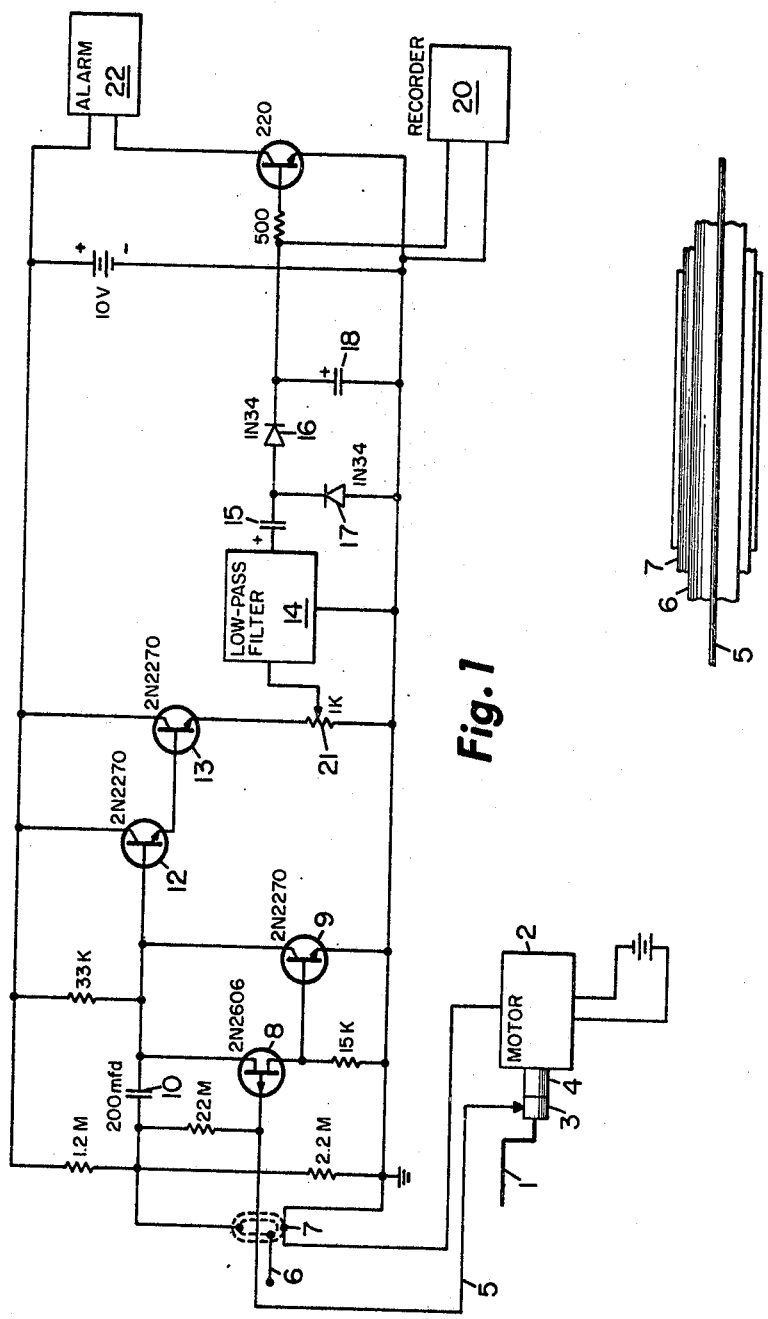
INVENTOR
IRVIN D. JOHNSON – # United States Patent Office 3,482,235
Patented Dec. 2, 1969

3,482,235
FIELD GRADIENT DETECTOR
Irvin D. Johnson, Littleton, Colo., assignor to Marathon Oil Company, Findlay, Ohio, a corporation of Ohio
Filed Dec. 1, 1965, Ser. No. 510,923
Int. Cl. G08b 21/00
U.S. Cl. 340—248                    6 Claims

ABSTRACT OF THE DISCLOSURE

Static electric charges can be detected by a conductive sensing probe which is in motion relative to the electrostatic fields to be detected and which is not shielded from the probe, which probe is connected to a very high impedance amplifier circuit which is operatively connected to drive an output signal device.

The present invention relates to new devices and methods for detection of electrical charges and field gradients and in particular relates to new devices comprising high impedance amplifiers for the detection of said fields and/or charges.

The detection of static electricity is important in a wide variety of areas including those in which static electricity may pose a serious fire hazard, e.g., gasoline or other flammable liquid loading racks, refineries, natural gas transmission lines, etc. Other uses for static electricity detectors are meteorological devices for the observation of movement of air masses by detecting the charges which they build up in the surrounding air; detection of charges built up by moving vehicles, e.g., aircraft prior to refueling, and tank trucks prior to unloading flammable liquids, etc. Also, while preferred for the measurement of static electric fields, the devices of the present invention are suitable for the detection of the fields set up by alternating currents flowing within conductors, e.g., power lines, where the devices may be utilized to provide a signal that a given line is "hot" without the need for contacting the line or in most cases even ascending the pole. Other miscellaneous uses include hospital operating rooms in which static electric charges may pose dangerous fire hazards when flammable anesthetics are being employed, production facilities for delicate electronic parts which may be damaged by exposure to discharges from electric field gradients and darkrooms for the manufacture or processing of photographic films where discharges from such gradients can cause sufficient light to damage the film.

In preferred transistorized embodiments of the present device, the entire circuitry and the related sensing probe can be packaged in a container the size of a common household flashlight and the complete device can have a total weight of less than about 1 pound.

The advantages of the present invention are accomplished by the use of a probe which sees the charge, that is, is not shielded from the charge, and of a very high impedance amplifier, that is, an amplifier circuit having a very high impedance from input to ground and also a much greater input impedance than output impedance. The input to ground impedance should be at least about 10 million ohms, more preferably at least about 100 million ohms and most preferably above about 1 billion ohms. The differential between input and output impedance (input impedance being the greater) should be at least about 10 million ohms, more preferably above about 100 million ohms, and most preferably above about 1 billion ohms.

The use of such very high impedance amplifiers permits a high degree of sensitivity to the detection of the electrostatic and other electrical field gradients. In preferred embodiments of the present invention, this sensitivity can be further enhanced by the use of coaxial conductors connecting the probe to the amplifier of the invention. These conductors are preferably transmission lines in which the outer conductor is fed an electrical potential which is approximately equal to the incoming signal from the probe. Even more preferably, the transmission line may be further protected by a third axial conductor which is grounded in order to provide shielding against stray AC fields. The sensitivity of the device may be controlled by biasing means and this is especially valuable where the device is used to detect only electrostatic fields above a certain dangerous threshold level. For example, in the monitoring of flammable liquid areas, the biasing means may be set so as not to detect vehicles having small innocuous electrostatic charges while providing a signal (either audible as by horn, or visual as by light, etc.), when vehicles of a dangerous potential level enter the area.

It is necessary to the devices of the present invention that the sensing probe move in relation to the electrical field gradients to be measured. By moving in relation to said fields is meant herein that the probe itself may move, e.g., oscillate, describe an arc, vibrate (as by attachment to the cone of an ordinary speaker driven by a signal of appropriate frequency), or the charge itself may move, e.g., the charge may be on a vehicle moving past the sensing device or the field may alternately collapse and build up, e.g., as with alternating current conductors.

The devices of the present invention comprise at least one probe moving relative to the fields which are to be detected, connecting means for conducting the signal from said probe to an amplifier, a very high impedance amplifier, and an output device which may be a quantitative device such as an oscilloscope or strip chart recorder or a voltmeter, or an audible or visual alarm device such as a horn, bell, or light.

FIGURE 1 illustrates a preferred embodiment of the present invention. FIGURE 2 shows details of a transmission line employed in FIGURE 1.

In FIGURE 1, the probe 1 is rotated axially by a motor 2 and the probe is sufficiently bent that its end describes a circle during rotation. A slip ring 3 insulated from the motor housing by an insulator 4 connects the probe to the central conductor 5 of a transmission line. The slip ring 4 need not be a close tolerance fit because the high impedance of the circuitry makes the resistance of the slip ring to probe connection relatively noncritical. The rotating probe may be shielded by some noninterfering material such as fiberglass reinforced polyester, polyethylene, etc. However, care must be taken that the shielding material does not itself build up a static electric charge which might cause the device to give false readings.

The central conductor 5 of the transmission line (see FIGURE 2 for detail) is surrounded by a coaxial conductor 6 in which a voltage is induced in order to prevent capacitance losses in the transmission line. This charged annular conductor 6 is in turn surrounded by a grounded annular conductor 7 which serves to shield the transmission line from stray fields through which the line may pass on its way to the amplifier. It is, of course, possible to have a number of probes connected to a single central conductor 5 so that a signal is given by the system and the cause of the electrostatic field is then determined by visually checking each of the probe locations.

In general, it is preferred that the transmission line be covered by an outer protective sheath of electrically insulating material 8.

The center connector 5 is connected to the gate of an N-type field effect transistor 8. The drain of the field effect is connected to the base of an NPN transistor 9 and the collector of the NPN transistor is connected to the source of the same N-type field effect transistor. The source of the N-type field effect transistor is also connected through a capacitor 10 (of about 220 microfarads) to the annular conductor 6 of the transmission line, thus inducing a voltage in said annular conductor which is proportional to the voltage received from the probe through the center conductor 5.

The source of the N-type effect transistor is also connected to the base of a second NPN transistor 12. The emitter of transistor 12 is connected to the base of transistor 13 to form a conventional Darlington pair configuration. The output from the emitter of transistor 13 is connected to a low pass filter 14 and then through a conventional rectifier circuit composed of a capacitor 15, a pair of diodes, 16 and 17, and a capacitor 18. (The rectification circuit shown in a double-type circuit which has an output signal having a voltage twice that of the input signal but other conventional rectification circuits may be utilized.)

A variable resistor 21 permits biasing of the amplifier to prevent its responding to electrostatic fields which are less than a preset minimum strength.

The remaining terminals of the electronic components are operatively connected, preferably as shown in FIGURE 1, to form an amplifier.

The output signal from the amplifier is fed to a conventional alarm circuit 22, as for example, the Sonalert Model SC-628 transistorized oscillator module in FIGURE 1. The output signal may also be fed to a recorder 22. Additional amplification may be provided as shown in FIGURE 1. Suitable power supplies are provided for the motor and for the circuitry.

What is claimed is:
1. A device for the detection of static electric charges comprising in combination a condutive sensing probe which is in motion relative to the electrostatic fields to be detected and which is not shielded from the field and which probe is connected to a very high impedance amplifier circuit, said amplifier circuit being operatively connected to drive an output signal device, said amplifier circuit having input to ground impedance of at least 10 million ohms and an input impedance at least about 10 million ohms greater than the output impedance of said amplifier circuit wherein the conductive sensing probe is connected to said very high impedance amplifier circuit by means of a coaxial cable comprising an inner conductor and an outer conductor and wherein a voltage approximately equal to the input signal from said conductive probe to said amplifier is maintained in the outer conductor.

2. The device of claim 1 wherein the outer conductor is surrounded by a grounded coaxial conductor effective to shield the outer conductor and the inner conductor against the effect of alternating currents in the area in which the electrostatic field detector is to be employed.

3. A device for the detection of static electric charges comprising in combination a conductive sensing probe which is in motion relative to the electrostatic fields to be detected and which is not shielded from the field and which probe is connected to a very high impedance amplifier circuit, said amplifier circuit being operatively connected to drive an output signal device and wherein the conductive sensing probe is connected to the very high impedance amplifier circuit by means of a coaxial cable comprising an inner conductor and an outer conductor and wherein a voltage approximately equal to the input signal from said conductive probe to said amplifier is maintained in the outer conductor, and wherein the outer conductor is surrounded by a grounded coaxial conductor effective to shield the outer conductor and the inner conductor against the effect of alternating currents in the area in which the electrostatic field detector is to be employed, and wherein the amplifier comprises a field effect transistor having a drain, said drain being connected to the base of a transistor, said field effect transistor having its source connected to the collector of said transistor, said field effect transistor having a gate which is connected to said probe, said source of said field effect transistor also being connected through a capacitor to the outer conductor on said transmission line.

4. The device of claim 3 wherein the signal from the collector of the transistor is fed to impedance-reducing circuitry so as to increase the power gain without substantially changing the voltage of said signal.

5. The device of claim 1 wherein the amplifier comprises variable biasing means for permitting said amplifier to produce an output only when said probe is in the presence of static electrical charges of at least a preset magnitude.

6. The device of claim 1 wherein the amplifier circuit comprises a field effect transistor.

References Cited
UNITED STATES PATENTS

| | | | |
|---|---|---|---|
| 2,175,366 | 10/1939 | Shetzline | 333—12 XR |
| 3,201,775 | 8/1965 | Pedersen | 340—248 XR |
| 3,273,066 | 9/1966 | Ruhnke. | |

JOHN W. CALDWELL, Primary Examiner

DANIEL MYER, Assistant Examiner

U.S. Cl. X.R.
324—72